(12) United States Patent
Dumitru et al.

(10) Patent No.: US 12,456,917 B2
(45) Date of Patent: Oct. 28, 2025

(54) PROTECTION DEVICE

(71) Applicant: Infineon Technologies Austria AG, Villach (AT)

(72) Inventors: Florin-Silviu Dumitru, Bucharest (RO); Niranjan Reddy Suravarapu, Villach (AT); Alexandra-Oana Petroianu, Bucharest (RO)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 252 days.

(21) Appl. No.: 18/125,566

(22) Filed: Mar. 23, 2023

(65) Prior Publication Data

US 2024/0322670 A1    Sep. 26, 2024

(51) Int. Cl.
*H02M 1/32* (2007.01)
*H02M 3/158* (2006.01)

(52) U.S. Cl.
CPC ............. *H02M 1/32* (2013.01); *H02M 3/158* (2013.01)

(58) Field of Classification Search
CPC ........ H02M 1/32; H02M 1/325; H02M 1/158; H02M 1/1584; H02M 1/155
See application file for complete search history.

(56) References Cited

U.S. PATENT DOCUMENTS

| | | | |
|---|---|---|---|
| 2006/0050541 A1* | 3/2006 | Terdan | H02H 9/001 363/70 |
| 2008/0192397 A1* | 8/2008 | Liu | H02M 1/32 361/86 |
| 2012/0026632 A1* | 2/2012 | Acharya | H03K 17/081 361/56 |

* cited by examiner

*Primary Examiner* — Nguyen Tran
(74) *Attorney, Agent, or Firm* — Cooper Legal Group LLC

(57) ABSTRACT

A protection device includes a first protection stage comprising a first p-type transistor comprising a first terminal, a second terminal, and a first gate terminal. A first voltage regulating device is connected between the first terminal and the second terminal. A second voltage regulating device is connected between the first terminal and the first gate terminal. A third voltage regulating device is connected to the first gate terminal. A first current source is connected to the first gate terminal.

20 Claims, 6 Drawing Sheets

PROTECTION DEVICE

TECHNICAL FIELD

The present disclosure relates generally to protection devices, and, more particularly, to a p-type high voltage protection device.

BACKGROUND

Protection devices are employed to provide protection to devices from transient conditions. Protection devices promote acceptable device operation under certain (e.g., peak) conditions.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a protection device comprises a first protection stage comprising a first p-type transistor comprises a first terminal, a second terminal, and a first gate terminal, a first voltage regulating device connected between the first terminal and the second terminal, a second voltage regulating device connected between the first terminal and the first gate terminal, a third voltage regulating device connected to the first gate terminal, and a first current source connected to the first gate terminal.

According to some embodiments, a protection device comprises a Zener ladder of series-connected Zener diodes, a transistor stack of series-connected transistors connected to rungs of the Zener ladder, and first bias current sources connected to the rungs of the Zener ladder.

According to some embodiments, the protection device comprises a resistor ladder of series-connected resistors connected to the rungs of the Zener ladder.

According to some embodiments, the protection device comprises a bias device connected between the Zener ladder and a voltage supply terminal, and a second bias current source connected to the bias device.

According to some embodiments, a device comprises means for connecting a first protection stage comprising a first p-type transistor comprising a first terminal, a second terminal, and a first gate terminal to a device; means for connecting a first voltage regulating device between the first terminal and the second terminal; means for connecting a second voltage regulating device between the first terminal and the first gate terminal; means for connecting a third voltage regulating device to the first gate terminal; and means for connecting a first current source to the first gate terminal.

According to some embodiments, a method, comprises connecting a first protection stage comprising a first p-type transistor comprising a first terminal, a second terminal, and a first gate terminal to a device; connecting a first voltage regulating device between the first terminal and the second terminal; connecting a second voltage regulating device between the first terminal and the first gate terminal; connecting a third voltage regulating device to the first gate terminal; and connecting a first current source to the first gate terminal.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
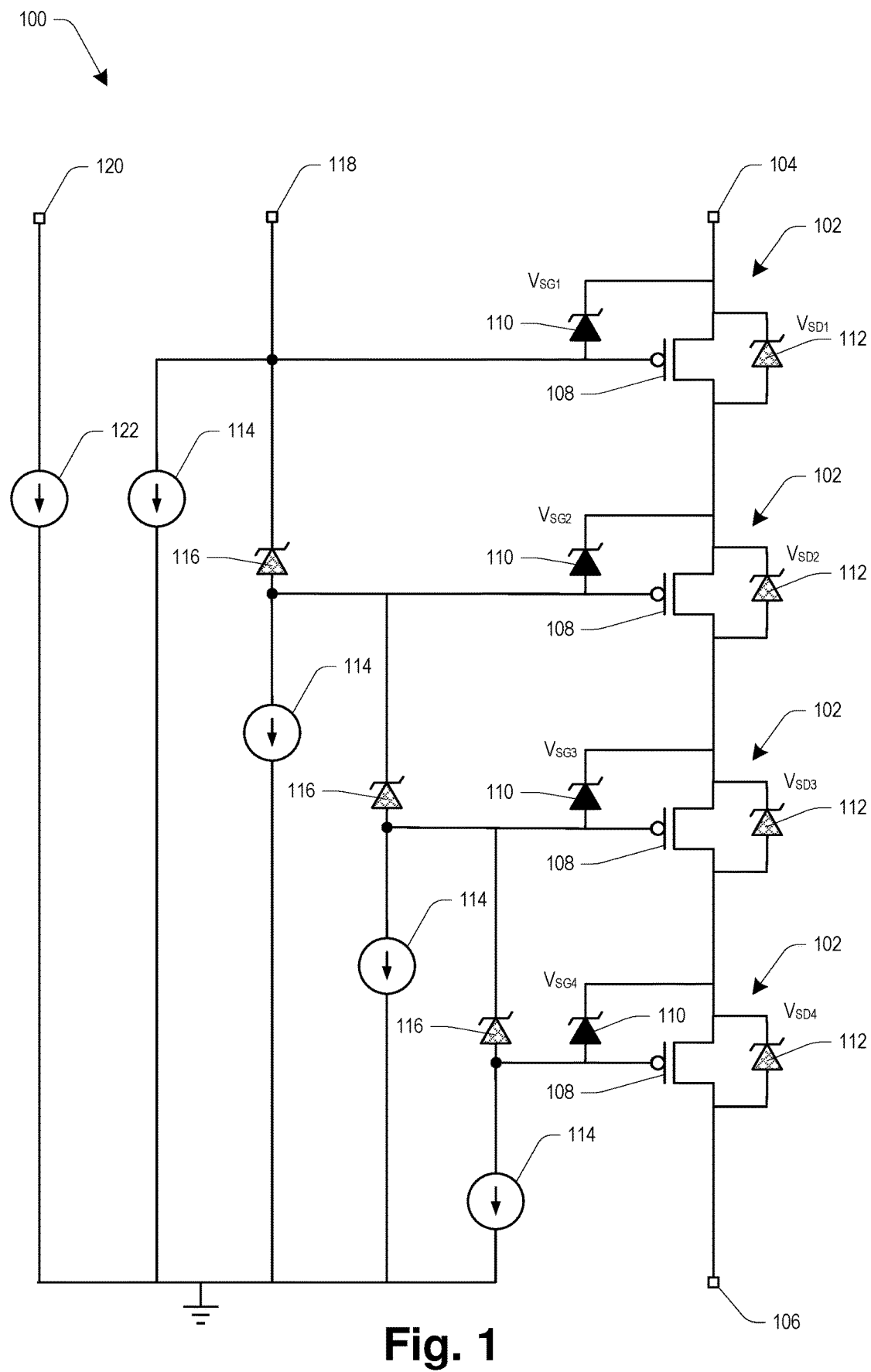
FIG. 1 is a circuit diagram of a protection device, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A protection device comprises multiple stages, each stage having a p-type transistor with a first diode connected across the source and drain of the p-type transistor, a second diode connected between source and the gate of the p-type transistor, and a current source connected to the gate of the p-type transistor. In some embodiments, the first diode and the second diode are Zener diodes, but voltage regulating device(s) other than diodes may be used. The first diode may be a stack of series-connected Zener diodes. A breakdown voltage across the stack of series-connected Zener diodes corresponds to a voltage rating of the p-type transistor. The number of stages corresponds to the level of voltage protection required for protecting a device protected by the protection device.

Referring to FIG. 1 a schematic diagram of a protection device 100 is provided, according to some embodiments. The protection device 100 comprises stages 102 connected in series between a high side terminal 104 and a low side terminal 106. The number of stages 102 may vary depending on the device or devices being protected by the protection device 100. Each stage 102 comprises a p-type transistor 108, a source to gate (SG) diode 110 connected between the source and the gate of the p-type transistor 108, a source to drain (SD) diode 112 connected between the source and the drain of the p-type transistor 108, and a current source 114 connected to the gate of the p-type transistor 108. Stage diodes 116 connect gates of the p-type transistors 108 of adjacent stages 102. A gate terminal 118 is connected to the gate of the p-type transistor 108 of the stage 102 connected to the high side terminal 104. In some embodiments, a bias terminal 120 is connected to a current source 122. The high side terminal 104, the low side terminal 106, the gate terminal 118, and the bias terminal 120, may be connected in various configurations to the device or devices being protected by the protection device 100. The bias terminal 120 may be used to connect the current source 122 to the device being protected by the protection device 100 to provide a bias current. In some embodiments, the SD diodes 112 and/or the stage diodes 116 comprise a stack of series-connected Zener diodes and/or other type(s) of voltage regulating device(s). Accordingly, where diode(s), Zener, Zener diode(s), and/or the like are used, mentioned, etc. herein, one or more other type(s) of voltage regulating device(s) may be substituted for and/or supplemented with said diode(s), Zener, Zener diode(s), and/or the like. A breakdown voltage across the SD diode 112 comprising the stack of series-connected Zener diodes corresponds to a voltage rating of the p-type transistor 108, where the number of Zener diodes in the stack may vary with the breakdown voltage. The number of diodes in the stage diodes 116 may be less (e.g., one less) than the number of diodes in the SD diodes 112. The number of diodes in the stage diodes 116 may be greater than the number of diodes in the SD diodes 112. The number of diodes in the stage diodes 116 may be equal to the number of diodes in the SD diodes 112.

Figure 2:
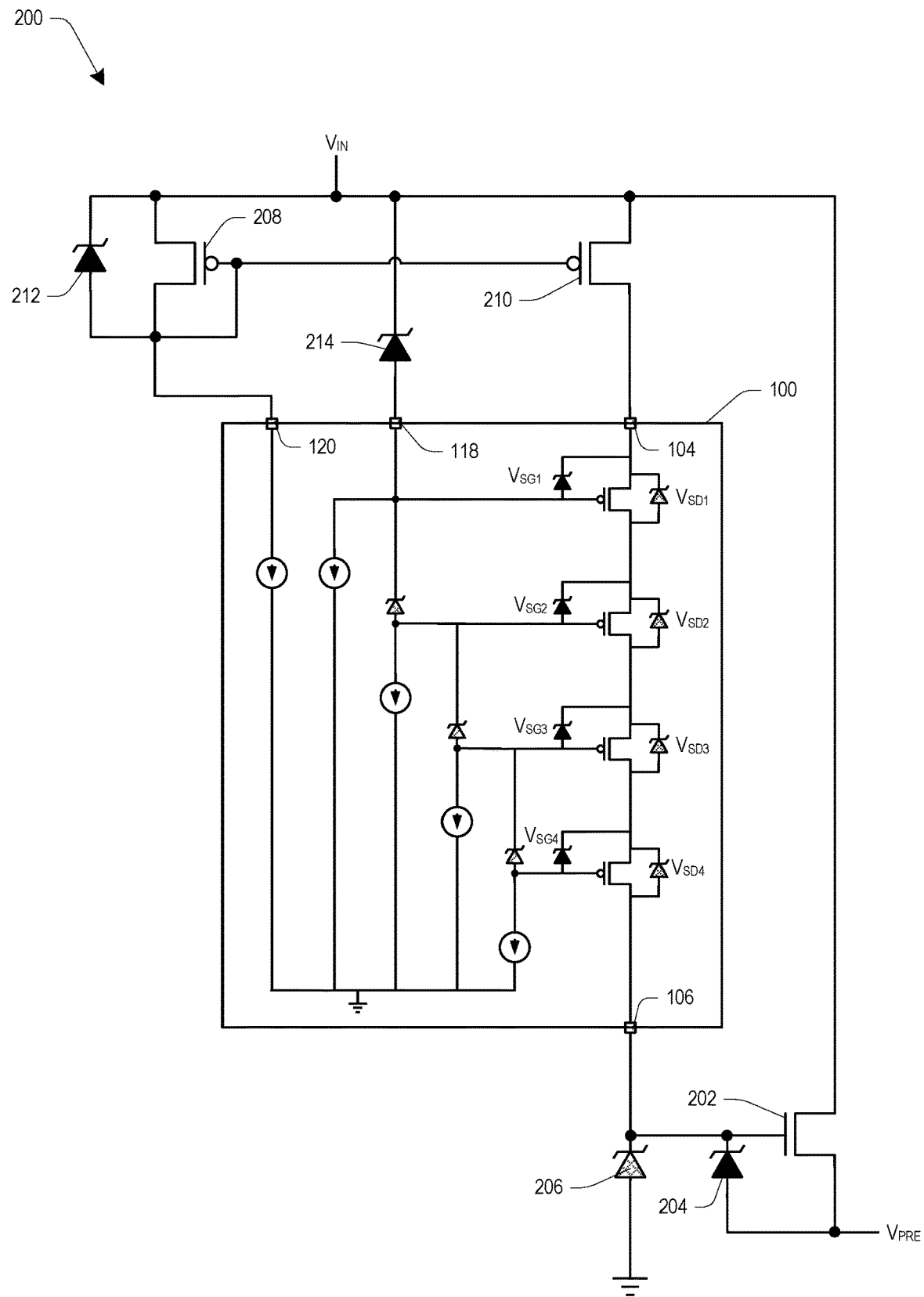
FIG. 2 is a diagram of a circuit with a protection device, according to some embodiments.

Referring to FIG. 2, the protection device 100 is used in conjunction with a switch circuit 200, according to some embodiments. For ease of illustration, the reference numerals for the elements of the protection device 100 shown in FIG. 1 are omitted in FIG. 2. In some embodiments, the switch circuit 200 comprises a high voltage n-type transistor 202 with a source to gate Zener diode 204, a bias Zener diode 206 connected to the low side terminal 106 of the protection device 100, a p-type transistor 208 having a source to gate connection and being connected between an input supply voltage, $V_{IN}$, and the bias terminal 120 of the protection device 100, a p-type transistor 210 having a gate connected to the gate of the p-type transistor 208 and being connected between the input supply voltage, $V_{IN}$, and the high side terminal 104 of the protection device 100, a Zener diode 212 connected across the source and drain of the p-type transistor 208, and a Zener diode 214 connected to the gate terminal 118 of the protection device 100. The transistors 208, 210 may define a current mirror, which in combination with the high voltage n-type transistor 202 provides a switching function. The Zener diode 214 may be a bias device. The Zener bias diode 206 biases the high voltage n-type transistor 202. In some embodiments, the bias Zener diode 206 comprises a stack of series connected Zener diodes and/or other type(s) of voltage regulating device(s), where the number of Zener diodes in the stack depends on the level of biasing required.

In some embodiments, during operation the switch circuit 200 generates a pre-supply voltage, $V_{PRE}$, for supplying other components. The protection device 100 clamps the supply voltage, $V_{PRE}$, generated at the high voltage n-type transistor 202 in cases where the input supply voltage, $V_{IN}$, exceeds the operation point of the protection device 100.

Figure 3:
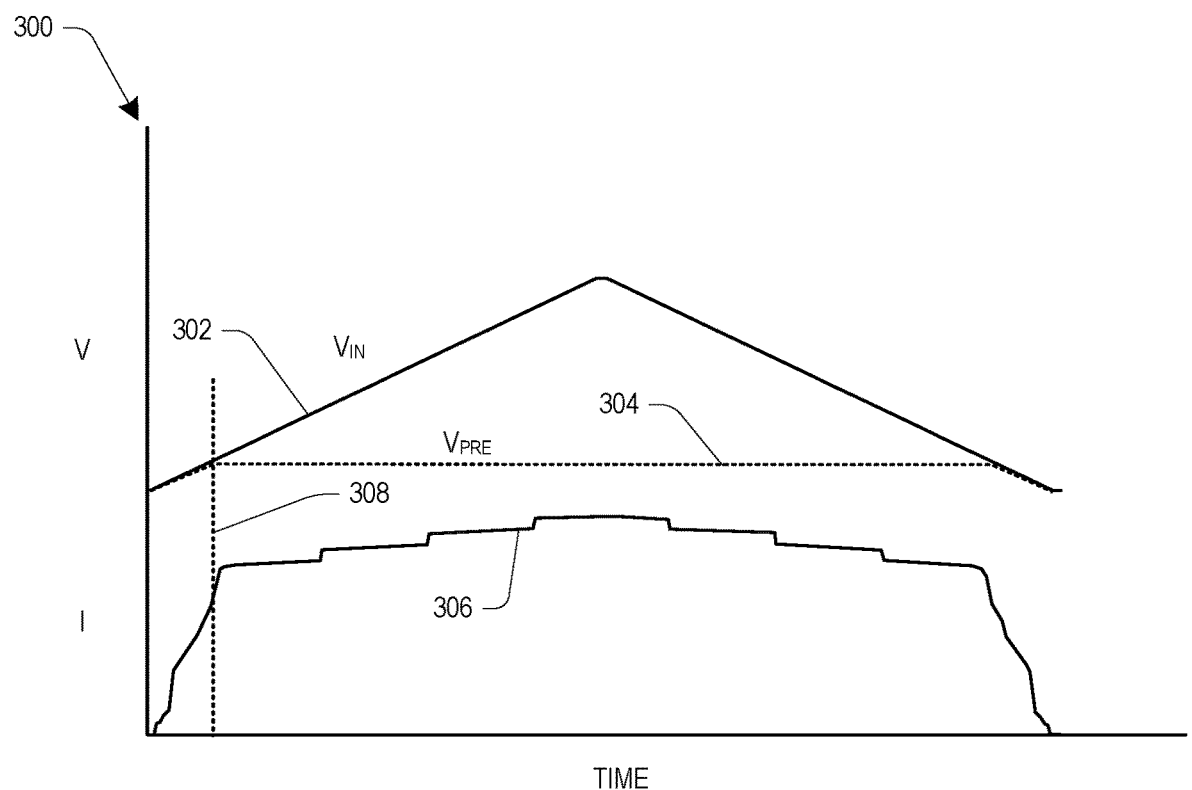
FIGS. 3 and 4 are signal diagrams, according to some embodiments.
Figure 4:
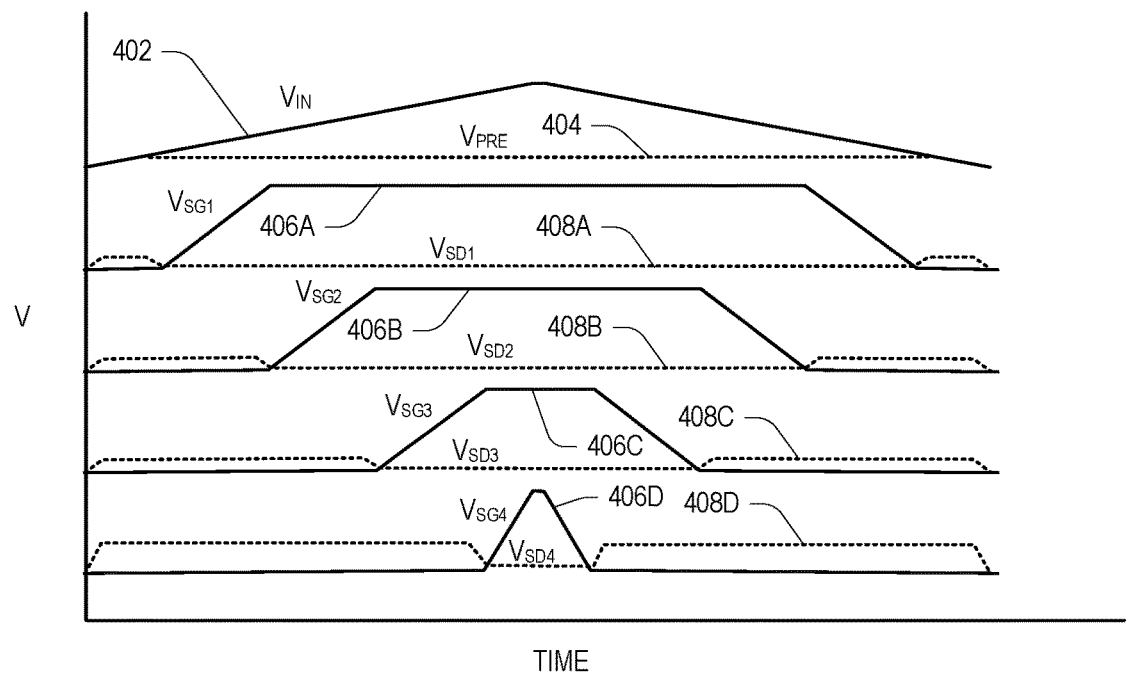

FIGS. 3 and 4 are diagrams 300, 400 illustrating the operation of the switch circuit 200 and the protection device 100, according to some embodiments. FIG. 3 shows a $V_{IN}$ voltage signal 302, a $V_{PRE}$ voltage signal 304, and a protection device current signal 306. The protection device 100 clamps $V_{PRE}$ at 308 as $V_{IN}$ increases. The protection device current signal 306 exhibits a step-wise increase as each stage 102 of the protection device 100 is activated.

FIG. 4 shows a $V_{IN}$ voltage signal 402, a $V_{PRE}$ voltage signal 404, stage VSG voltage signals 406A-406D, and stage VSD voltage signals 408A-408D for the stages 102 of the protection device 100. The stage VSG voltage signals 406A-406D and the stage VSD voltage signals 408A-408D illustrate the activation of each stage as $V_{IN}$ increases.

Figure 5:
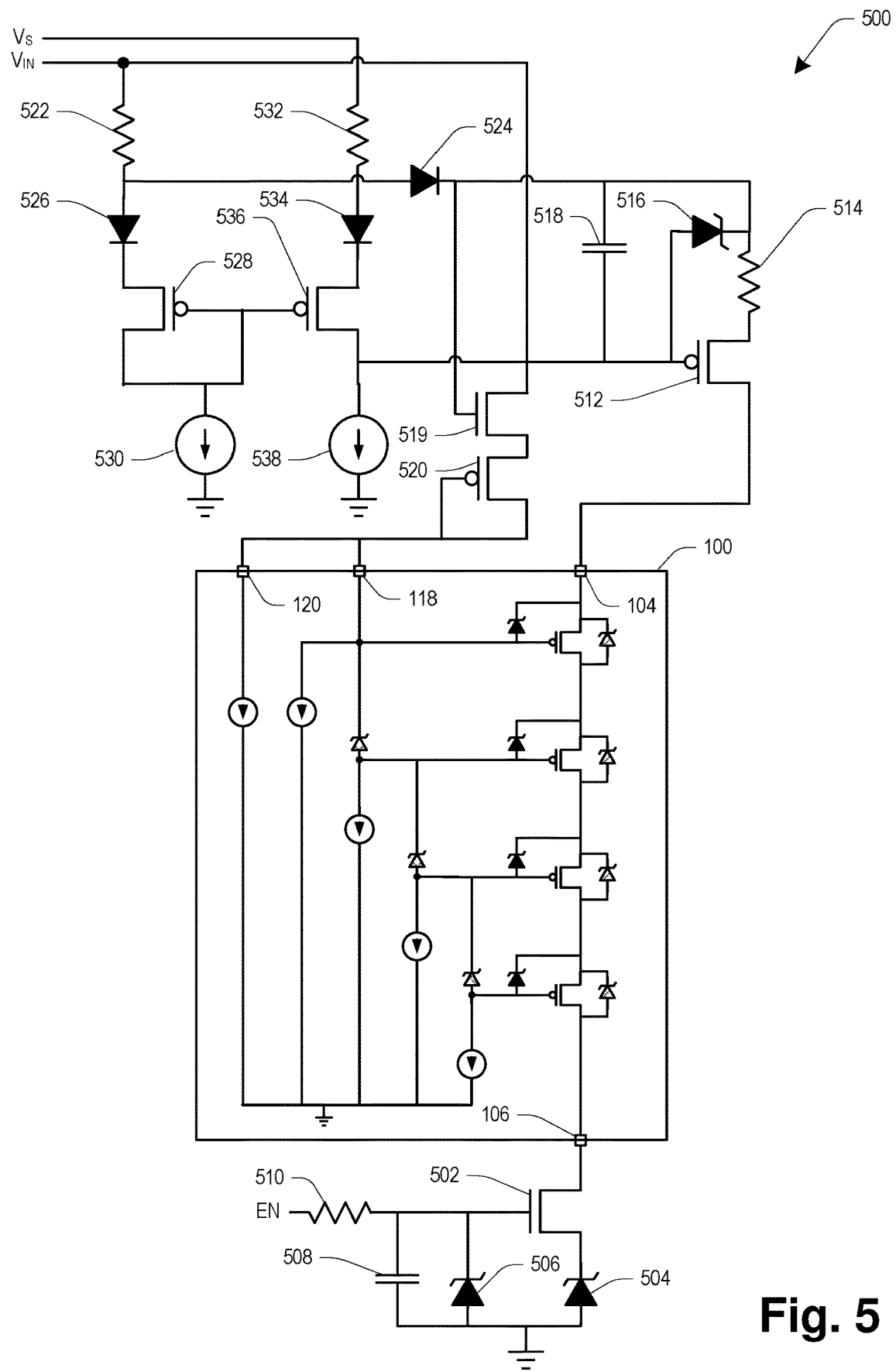
FIG. 5 is a diagram of a circuit with a protection device, according to some embodiments.

Referring to FIG. 5, the protection device 100 is used in conjunction with a current sense amplifier circuit 500, according to some embodiments. For ease of illustration, the reference numerals for the elements of the protection device 100 shown in FIG. 1 are omitted in FIG. 5. In some embodiments, the current sense amplifier circuit 500 comprises a high voltage n-type transistor 502 connected between the low side terminal 106 and a Zener diode 504, a Zener diode 506 connected to a gate of the high voltage n-type transistor 502, a gate capacitor 508 connected to the gate of the high voltage n-type transistor 502 and in parallel with the Zener diode 506, and a gate resistor 510 connected to the gate of the high voltage n-type transistor 502 configured to receive an enable signal, EN, for enabling the high voltage n-type transistor 502. A drain of a p-type transistor 512 (e.g., an output transistor) is connected to the high side terminal 104. A resistor 514 is connected to the source of the p-type transistor 512, and a Zener diode 516 connects the resistor 514 to the gate of the p-type transistor 512. A capacitor 518 is connected in parallel with the Zener diode 516. An input supply voltage, $V_{IN}$, is connected to a bias transistor pair including an n-type transistor 519 in series with a p-type transistor 520. The bias transistor pair may be a bias device. The p-type transistor 520 is diode connected and is connected to the gate terminal 118 and the bias terminal 120. The input supply voltage, $V_{IN}$, is connected to a resistor 522. The resistor is connected to the gate of the n-type transistor 519 by a diode 524. The diode 524 is also connected to the resistor 514, the Zener diode 516, and the capacitor 518. A diode 526 also connects the resistor 522 to a diode connected p-type transistor 528. The gate of the p-type transistor 528 is connected to a current source 530 for biasing the p-type transistor 528. The p-type transistor 528 may be a bias device in the current sense amplifier circuit 500. A sense voltage, $V_S$, is connected to a resistor 532. The resistor 532 is connected by a diode 534 to a p-type transistor 536. The gates of the p-type transistors 528, 536 are interconnected. The p-type transistor 528 is connected to a current source 538. The current sense amplifier circuit 500 amplifies and translates a differential voltage across $V_{IN}$ to $V_S$ (e.g., $V_{IN}$-$V_S$) to a different voltage level at the source of the high voltage n-type transistor 502. The differential voltage across $V_{IN}$ to $V_S$ is regulated by the p-type transistor 512. As the differential voltage increases, the $V_{SD}$ of the p-type transistor 512 increases drawing a current through the resistor 522 and the diode 524. The devices 528, 536, 518, 512 are low voltage devices. The current through the p-type transistor 512 is sourced from high side to low side through the protection device 100. The transistors 519, 520 define the safe high side voltage in functional as well as power down mode.

Figure 6:
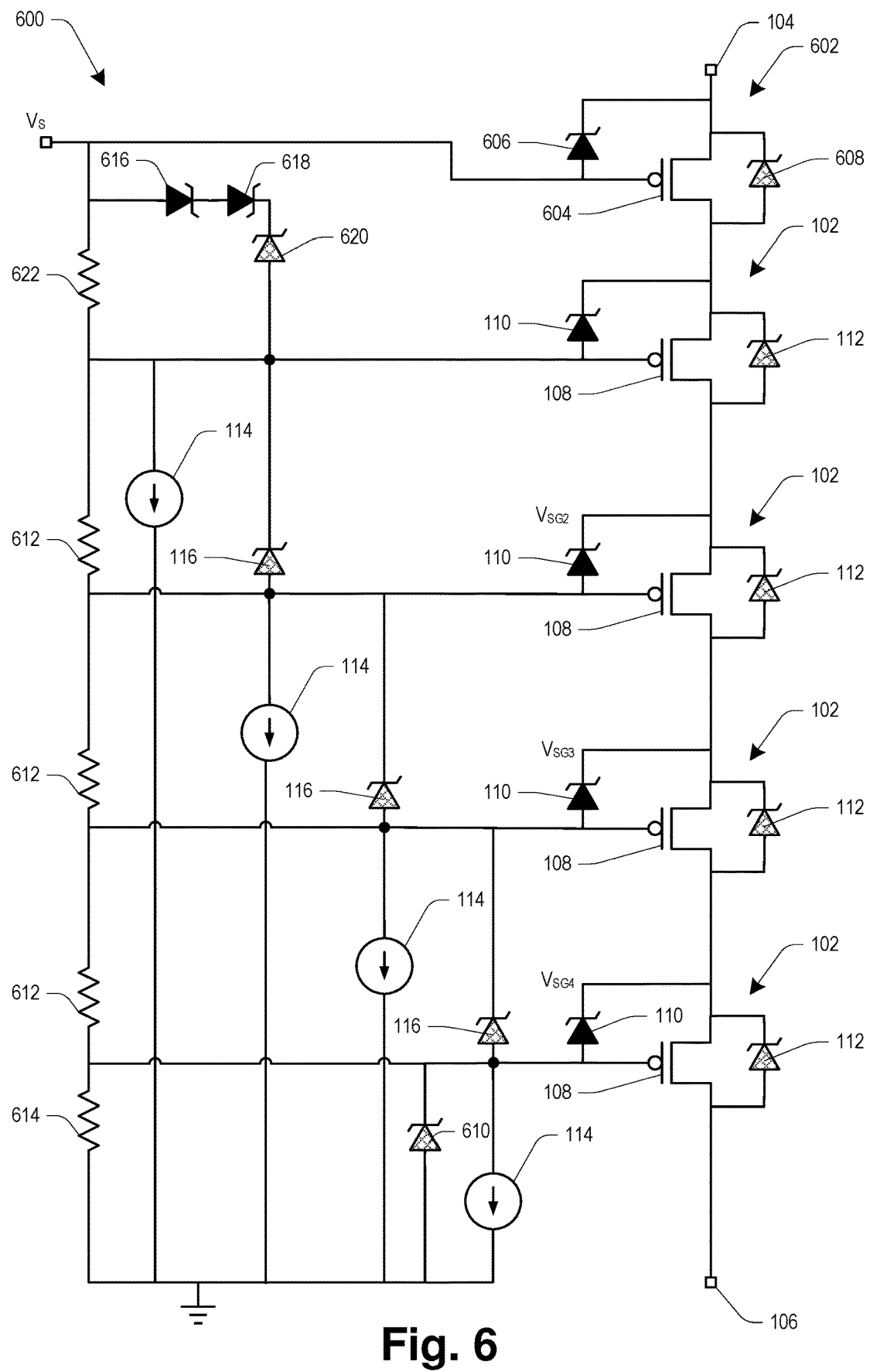
FIG. 6 is a circuit diagram of a protection device, according to some embodiments.

Referring to FIG. 6, a schematic diagram of a protection device 600 is provided, according to some embodiments. The elements corresponding to those in the protection device 100 of FIG. 1 are not changed. The protection device 600 comprises an input stage 602 between the uppermost stage 102 and the high side terminal 104. The input stage 602 comprises a p-type transistor 604, a source to gate (SG) diode 606 connected between the source and the gate of the p-type transistor 604, a source to drain (SD) diode 608 connected between the source and the drain of the p-type transistor 604. In some embodiments, the SD diode 608 comprises a stack of series-connected Zener diodes. A breakdown voltage across the SD diode 608 comprising the stack of series-connected Zener diodes corresponds to a voltage rating of the p-type transistor 604, where the number of Zener diodes in the stack may vary with the breakdown voltage. The protection device comprises a diode 610 in parallel with the current source 114 in the lowermost stage 102. The diode 610 may comprise a stack of Zener diodes, where the number of diodes may be less (e.g., one less) than the number of diodes in the SD diodes 112. The number of diodes of 610 may be greater than the number of diodes in the SD diodes 112. The number of diodes of 610 may be equal to the number of diodes in the SD diodes 112. Stage resistors 612 are connected in parallel with the stage diodes 116, and a resistor 614 is connected in parallel with the diode 610.

A supply voltage, $V_S$, is connected to a gate of the p-type transistor 604 for enabling the protection device 600. The supply voltage, $V_S$, is connected to series connected Zener diodes 616, 618 that provide negative pulse immunity. A diode 620 is connected between the Zener diode 618 and the gate of the p-type transistor 108 of the uppermost stage 102.

The diode 620 may comprise a stack of Zener diodes where the number of Zener diodes may be less (e.g., one less) than the number of stacked diodes in the SD diodes 112. The number of diodes of 620 may be greater than the number of diodes in the SD diodes 112. The number of diodes of 620 may be equal to the number of diodes in the SD diodes 112. A resistor 622 is connected between the supply voltage, $V_S$, and the gate of the p-type transistor 108 of the uppermost stage 102. The p-type transistors 108, 604 define a transistor stack. The diodes 116, 610, 620 define a diode ladder connected to rungs of the transistor stack. The resistors 612, 614, 622 define a resistor ladder connected to rungs of the diode ladder. The protection device 600 emulates the functionality of a level shifter with multiple levels of protection, including providing protection for negative voltage transitions up to 2 Zener break down voltages, and providing safe operating voltages with the resistor ladder even in the absence of output from the current bias circuit, i.e., during startup. Once the bias currents are available, each p-type transistor 108 is strongly biased in terms of SG and SD voltages.

Figure 7:
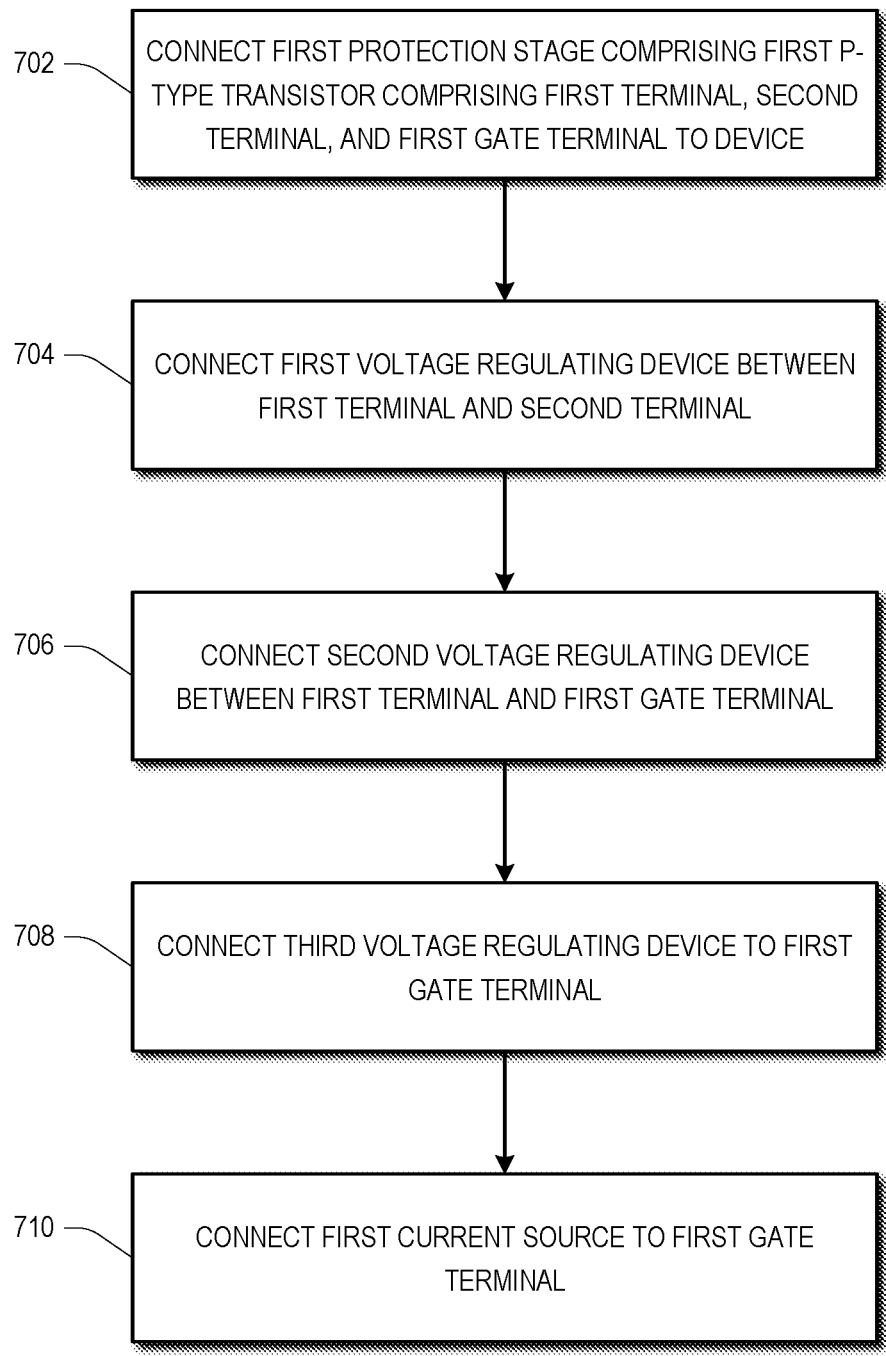
FIG. 7 illustrates a method of protecting a device, according to some embodiments.

Referring to FIG. 7, a flow diagram of a method 700 for protecting a device is provided, according to some embodiments. At 702, a first protection stage comprising a first p-type transistor comprising a first terminal, a second terminal, and a first gate terminal is connected to a device. A 704, a first voltage regulating device is connected between the first terminal and the second terminal. At 706, a second voltage regulating device is connected between the first terminal and the first gate terminal. At 708, a third voltage regulating device is connected to the first gate terminal. At 710, a first current source is connected to the first gate terminal.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

According to some embodiments, a protection device comprises a first protection stage comprising a first p-type transistor comprises a first terminal, a second terminal, and a first gate terminal, a first voltage regulating device connected between the first terminal and the second terminal, a second voltage regulating device connected between the first terminal and the first gate terminal, a third voltage regulating device connected to the first gate terminal, and a first current source connected to the first gate terminal.

According to some embodiments, the first voltage regulating device, the second voltage regulating device, and the third voltage regulating device each comprise at least one Zener diode.

According to some embodiments, at least one of the first voltage regulating device, the second voltage regulating device, or the third voltage regulating device comprises a first Zener diode connected in series with a second Zener diode.

According to some embodiments, at least one of the first voltage regulating device, the second voltage regulating device, or the third voltage regulating device comprises a stack of series-connected Zener diodes, and a breakdown voltage across the stack of series-connected Zener diodes corresponds to a voltage rating of the first p-type transistor.

According to some embodiments, the protection device comprises a second protection stage comprising a second p-type transistor comprises a third terminal connected to the second terminal of the first p-type transistor, a fourth terminal, and a second gate terminal, a fourth voltage regulating device connected between the third terminal and the fourth terminal, a fifth voltage regulating device connected between the third terminal and the second gate terminal, a sixth voltage regulating device connected between the third voltage regulating device and the second gate terminal, and a second current source connected to the second terminal.

According to some embodiments, the protection device comprises a device connected to a supply voltage terminal and the first terminal, and a bias device connected between the first gate terminal and the supply voltage terminal.

According to some embodiments, the device comprises a current mirror connected to the supply voltage terminal, a first Zener diode connected to the second terminal, and an n-type transistor comprises a third terminal connected to the supply voltage terminal, a fourth terminal connected to a pre-supply terminal, and a second gate terminal connected to the first Zener diode, and a second Zener diode connected between the second gate terminal and the fourth terminal, and the bias device comprises a third Zener diode connected between the first current source and the supply voltage terminal.

According to some embodiments, the device comprises a current sense amplifier connected to the supply voltage terminal and having an output transistor connected to the first terminal, and the bias device comprises a first bias transistor connected to an input of the current sense amplifier, and a second bias transistor connected between the first bias transistor and the first current source.

According to some embodiments, the protection device comprises a second p-type transistor comprises a third terminal connected to a signal input terminal, a fourth terminal connected to the first terminal of the first p-type transistor, and a second gate terminal connected to a supply voltage terminal, a fourth voltage regulating device connected between the third terminal and the fourth terminal, a fifth voltage regulating device connected between the third terminal and the second gate terminal, a sixth voltage regulating device connected between the supply voltage terminal and the first gate terminal, and a first resistor connected between the supply voltage terminal and the first gate terminal, wherein the second terminal is connected to a signal output terminal.

According to some embodiments, the protection device comprises a second protection stage comprising a third p-type transistor comprises a fifth terminal connected to the second terminal of the first p-type transistor, a sixth terminal connected to the signal output terminal, and a third gate terminal, a seventh voltage regulating device connected between the fifth terminal and the sixth terminal, an eighth voltage regulating device connected between the fifth terminal and the third gate terminal, a ninth voltage regulating device connected between the third voltage regulating device and the third gate terminal, and a second current source connected to the third gate terminal, and a second resistor connected between the supply voltage terminal and the third gate terminal.

According to some embodiments, a protection device comprises a Zener ladder of series-connected Zener diodes, a transistor stack of series-connected transistors connected to rungs of the Zener ladder, and first bias current sources connected to the rungs of the Zener ladder.

According to some embodiments, the protection device comprises a resistor ladder of series-connected resistors connected to the rungs of the Zener ladder.

According to some embodiments, the protection device comprises a bias device connected between the Zener ladder and a voltage supply terminal, and a second bias current source connected to the bias device.

According to some embodiments, the bias device comprises at least one of a diode, a Zener diode, or a transistor.

According to some embodiments, a first rung of the Zener ladder comprises a stack of series-connected Zener diodes, and a breakdown voltage across the stack of series-connected Zener diodes corresponds to a voltage rating of a transistor in the transistor stack connected to the first rung of the Zener ladder.

According to some embodiments, a first transistor in the transistor stack comprises a source-to-drain protection diode, and a source-to-gate protection diode.

According to some embodiments, the source-to-drain protection diode comprises a stack of series-connected Zener diodes, and a breakdown voltage across the stack of series-connected Zener diodes corresponds to a voltage rating of the first transistor.

According to some embodiments, a device comprises means for connecting a first protection stage comprising a first p-type transistor comprising a first terminal, a second terminal, and a first gate terminal to a device; means for connecting a first voltage regulating device between the first terminal and the second terminal; means for connecting a second voltage regulating device between the first terminal and the first gate terminal; means for connecting a third voltage regulating device to the first gate terminal; and means for connecting a first current source to the first gate terminal.

According to some embodiments, a method comprises connecting a first protection stage comprises a first p-type transistor comprises a first terminal, a second terminal, and a first gate terminal to a device, connecting a first voltage regulating device between the first terminal and the second terminal, connecting a second voltage regulating device between the first terminal and the first gate terminal, connecting a third voltage regulating device to the first gate terminal, and connecting a first current source to the first gate terminal.

According to some embodiments, connecting at least one of the first voltage regulating device, the second voltage regulating device, or the third voltage regulating device comprises connecting a stack of series-connected Zener diodes, and a breakdown voltage across the stack of series-connected Zener diodes corresponds to a voltage rating of the first p-type transistor.

According to some embodiments, the method comprises connecting a second protection stage comprises a second p-type transistor comprises a third terminal connected to the second terminal of the first p-type transistor, a fourth terminal, and a second gate terminal to the first protection stage, connecting a fourth voltage regulating device between the third terminal and the fourth terminal, connecting a fifth voltage regulating device between the third terminal and the second gate terminal, connecting a sixth voltage regulating device between the third voltage regulating device and the second gate terminal, and connecting a second current source to the second terminal.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally to be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A protection device, comprising:
a first protection stage comprising:
   a first p-type transistor comprising a first terminal, a second terminal, and a first gate terminal;
   a first voltage regulating device connected between the first terminal and the second terminal;
   a second voltage regulating device connected between the first terminal and the first gate terminal;
   a third voltage regulating device connected to the first gate terminal; and
   a first current source connected to the first gate terminal, wherein:
      the first voltage regulating device comprises a reverse biased device distinct from the first p-type transistor.

2. The protection device of claim 1, wherein:
the first voltage regulating device, the second voltage regulating device, and the third voltage regulating device each comprise at least one Zener diode.

3. The protection device of claim 1, wherein:
at least one of the first voltage regulating device, the second voltage regulating device, or the third voltage regulating device comprises a first Zener diode connected in series with a second Zener diode.

4. The protection device of claim 1, wherein:
at least one of the first voltage regulating device, the second voltage regulating device, or the third voltage regulating device comprises a stack of series-connected Zener diodes; and
a breakdown voltage across the stack of series-connected Zener diodes corresponds to a voltage rating of the first p-type transistor.

5. The protection device of claim 1, comprising:
a second protection stage comprising:
   a second p-type transistor comprising a third terminal connected to the second terminal of the first p-type transistor, a fourth terminal, and a second gate terminal;
   a fourth voltage regulating device connected between the third terminal and the fourth terminal;
   a fifth voltage regulating device connected between the third terminal and the second gate terminal;
   a sixth voltage regulating device connected between the third voltage regulating device and the second gate terminal; and
   a second current source connected to the second terminal.

6. The protection device of claim 1, comprising:
a device connected to a supply voltage terminal and the first terminal; and
a bias device connected between the first gate terminal and the supply voltage terminal.

7. The protection device of claim 6, wherein:
the device comprises:
   a current mirror connected to the supply voltage terminal;
   a first Zener diode connected to the second terminal; and
   an n-type transistor comprising a third terminal connected to the supply voltage terminal, a fourth terminal connected to a pre-supply terminal, and a second gate terminal connected to the first Zener diode; and
   a second Zener diode connected between the second gate terminal and the fourth terminal, and the bias device comprises:
   a third Zener diode connected between the first current source and the supply voltage terminal.

8. The protection device of claim 6, wherein:
the device comprises:
   a current sense amplifier connected to the supply voltage terminal and having an output transistor connected to the first terminal, and the bias device comprises:
   a first bias transistor connected to an input of the current sense amplifier; and
   a second bias transistor connected between the first bias transistor and the first current source.

9. The protection device of claim 1, comprising:
a second p-type transistor comprising a third terminal connected to a signal input terminal, a fourth terminal connected to the first terminal of the first p-type transistor, and a second gate terminal connected to a supply voltage terminal;
a fourth voltage regulating device connected between the third terminal and the fourth terminal;
a fifth voltage regulating device connected between the third terminal and the second gate terminal;
a sixth voltage regulating device connected between the supply voltage terminal and the first gate terminal; and
a first resistor connected between the supply voltage terminal and the first gate terminal, wherein:
the second terminal is connected to a signal output terminal.

10. The protection device of claim 9, comprising:
a second protection stage comprising:
a third p-type transistor comprising a fifth terminal connected to the second terminal of the first p-type transistor, a sixth terminal connected to the signal output terminal, and a third gate terminal;
a seventh voltage regulating device connected between the fifth terminal and the sixth terminal;
an eighth voltage regulating device connected between the fifth terminal and the third gate terminal;
a ninth voltage regulating device connected between the third voltage regulating device and the third gate terminal; and
a second current source connected to the third gate terminal; and
a second resistor connected between the supply voltage terminal and the third gate terminal.

11. A protection device, comprising:
a Zener ladder of series-connected Zener diodes;
a transistor stack of series-connected transistors connected to rungs of the Zener ladder; and
first bias current sources connected to the rungs of the Zener ladder, wherein:
the transistor stack of series-connected transistors comprises:
a first p-type transistor comprising a first terminal, a second terminal, and a first gate terminal;
a first voltage regulating device connected between the first terminal and the second terminal;
a second voltage regulating device connected between the first terminal and the first gate terminal;
a second p-type transistor comprising a third terminal connected to the second terminal of the first p-type transistor, a fourth terminal, and a second gate terminal;
a third voltage regulating device connected between the third terminal and the fourth terminal; and
a fourth voltage regulating device connected between the third terminal and the second gate terminal;
the Zener ladder comprises:
a first Zener diode connected to the first gate terminal; and
a second Zener diode connected to the second gate terminal; and
the first bias current sources comprise:
a first current source connected to the first gate terminal; and
a second current source connected to the second gate terminal.

12. The protection device of claim 11, comprising:
a resistor ladder of series-connected resistors connected to the rungs of the Zener ladder.

13. The protection device of claim 11, comprising:
a bias device connected between the Zener ladder and a voltage supply terminal; and
a second bias current source connected to the bias device.

14. The protection device of claim 13, wherein:
the bias device comprises at least one of a diode, a Zener diode, or a transistor.

15. The protection device of claim 11, wherein:
a first rung of the Zener ladder comprises a stack of series-connected Zener diodes; and
a breakdown voltage across the stack of series-connected Zener diodes corresponds to a voltage rating of a transistor in the transistor stack connected to the first rung of the Zener ladder.

16. The protection device of claim 11, wherein:
the first voltage regulating device comprises a source-to-drain protection diode; and
the second voltage regulating device comprises a source-to-gate protection diode.

17. The protection device of claim 16, wherein:
the source-to-drain protection diode comprises a stack of series-connected Zener diodes; and
a breakdown voltage across the stack of series-connected Zener diodes corresponds to a voltage rating of the first transistor.

18. A method, comprising:
connecting a first protection stage comprising a first p-type transistor comprising a first terminal, a second terminal, and a first gate terminal to a device;
connecting a first voltage regulating device between the first terminal and the second terminal;
connecting a second voltage regulating device between the first terminal and the first gate terminal;
connecting a third voltage regulating device to the first gate terminal;
connecting a first current source to the first gate terminal;
connecting a second protection stage comprising a second p-type transistor comprising a third terminal connected to the second terminal of the first p-type transistor, a fourth terminal, and a second gate terminal connected to the first protection stage;
connecting a fourth voltage regulating device between the third terminal and the fourth terminal;
connecting a fifth voltage regulating device between the third terminal and the second gate terminal;
connecting a sixth voltage regulating device between the third voltage regulating device and the second gate terminal; and
connecting a second current source to the second terminal.

19. The method of claim 18, wherein:
connecting at least one of the first voltage regulating device, the second voltage regulating device, or the third voltage regulating device comprises connecting a stack of series-connected Zener diodes; and
a breakdown voltage across the stack of series-connected Zener diodes corresponds to a voltage rating of the first p-type transistor.

20. The protection device of claim 11, wherein:
the first voltage regulating device comprises a reverse biased device distinct from the first p-type transistor.

* * * * *